(12) United States Patent
Esteghlal

(10) Patent No.: US 10,790,745 B2
(45) Date of Patent: Sep. 29, 2020

(54) CONTROL DEVICE AND METHOD FOR CONTROLLING A DC-TO-DC CONVERTER HAVING INPUT INTERFERENCE

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/341,208

(22) PCT Filed: Oct. 2, 2017

(86) PCT No.: PCT/EP2017/074942
§ 371 (c)(1),
(2) Date: Apr. 11, 2019

(87) PCT Pub. No.: WO2018/069077
PCT Pub. Date: Apr. 19, 2018

(65) Prior Publication Data
US 2019/0319537 A1   Oct. 17, 2019

(30) Foreign Application Priority Data
Oct. 11, 2016   (DE) .................. 10 2016 219 742

(51) Int. Cl.
*H02M 3/157* (2006.01)
*H02M 1/15* (2006.01)
*H02M 1/00* (2006.01)

(52) U.S. Cl.
CPC ............ *H02M 3/157* (2013.01); *H02M 1/15* (2013.01); *H02M 2001/0012* (2013.01)

(58) Field of Classification Search
CPC . H02M 3/157; H02M 1/15; H02M 2001/0012
See application file for complete search history.

(56) References Cited

U.S. PATENT DOCUMENTS 7,529,523 B1 * 5/2009 Young .................. H01Q 1/242
330/2
2001/0038545 A1 * 11/2001 Hooijer ............... H02M 1/4225
363/97
(Continued)

FOREIGN PATENT DOCUMENTS

DE          102007038587      5/2009
EP             2244369        10/2010
(Continued)

OTHER PUBLICATIONS

International Search Report for Application No. PCT/EP2017/074942 dated Mar. 7, 2018 (English Translation, 3 pages).

*Primary Examiner* — Thienvu V Tran
*Assistant Examiner* — Shahzeb K Ahmad
(74) *Attorney, Agent, or Firm* — Michael Best & Friedrich LLP

(57) ABSTRACT

The invention relates to a control system for a DC-to-DC converter. Variations in the input voltage of the DC-to-DC converter are compensated by an estimated value being calculated for the variations, and a control variable being determined for the DC-to-DC converter based on the estimated values of the input voltage. The estimated values for the input voltage can, for example, be determined on the basis of a polynomial, for example using a Lagrange expansion.

6 Claims, 2 Drawing Sheets

(56) References Cited

U.S. PATENT DOCUMENTS

| | | | |
|---|---|---|---|
| 2007/0247129 A1 | 10/2007 | Jacobs | |
| 2009/0167228 A1 | 7/2009 | Chung et al. | |
| 2010/0308649 A1* | 12/2010 | Kono | B60L 9/005 307/9.1 |
| 2013/0039099 A1* | 2/2013 | Wu | H02M 7/53871 363/40 |
| 2013/0234690 A1* | 9/2013 | Matsutani | H02M 3/156 323/282 |
| 2014/0028383 A1 | 1/2014 | Fisch | |

FOREIGN PATENT DOCUMENTS

| | | | |
|---|---|---|---|
| EP | 2722726 | 4/2014 | |
| WO | WO-2009021909 A1 * | 2/2009 | B50W 10/08 |

\* cited by examiner

CONTROL DEVICE AND METHOD FOR CONTROLLING A DC-TO-DC CONVERTER HAVING INPUT INTERFERENCE

BACKGROUND OF THE INVENTION

The present invention relates to a control apparatus for a DC-to-DC converter and to a DC-to-DC converter having such a control apparatus. The present invention also relates to a method for controlling a DC-to-DC converter.

DC-to-DC converters are used in numerous fields of application. They convert a DC voltage provided on the input side into an output voltage, wherein the output voltage generally has a voltage level which differs from the input voltage. In this case, the output voltage may be greater than or less than the input voltage.

In particular, a high-voltage vehicle electrical system having a voltage of several hundred volts can be electrically coupled to a low-voltage vehicle electrical system having a voltage of 12 V or possibly 24 V by means of a DC-to-DC converter, for example in an electric or hybrid vehicle. This makes it possible to exchange energy between the high-voltage vehicle electrical system and the low-voltage vehicle electrical system of the vehicle.

The document DE 10 2007 038 587 A1 discloses a method for operating a DC voltage converter in a hybrid vehicle. During such a method, the DC voltage converter is controlled on the basis of the driving state of the vehicle and/or the voltage of one of the vehicle electrical systems.

SUMMARY OF THE INVENTION

The present invention discloses a control apparatus for a DC-to-DC converter, a DC-to-DC converter, and a method for controlling a DC-to-DC converter.

The following is accordingly provided:

A control apparatus for a DC-to-DC converter, having a computing device and a control device. The computing device of the control apparatus is designed to calculate an estimated value for an input voltage of the DC-to-DC converter. The control device is designed to determine a controlled variable for the DC-to-DC converter on the basis of the calculated estimated value for the input voltage of the DC-to-DC converter. The determined controlled variable can then be made available to the DC-to-DC converter.

The following is also provided:

A DC-to-DC converter for converting an input voltage into an output voltage, having a control apparatus according to the invention. The DC-to-DC converter may also comprise a DC voltage converter. The controlled variable of the control apparatus can be made available to the DC voltage converter for the purpose of controlling the DC voltage converter.

The following is also provided:

A method for controlling a DC-to-DC converter, having the steps of calculating an estimated value for an input voltage of the DC-to-DC converter, and determining a controlled variable for the DC-to-DC converter on the basis of the calculated estimated value for the input voltage.

The present invention is based on the knowledge that the input voltage of a DC-to-DC converter is possibly not an ideal DC voltage of a constant, predetermined level, but rather the input voltage may be affected by different interference, for example ripple or the like, during actual operation. In order to be able to provide a constant output voltage even in such a case, that is to say in the case of an input voltage with superimposed interference, the interference in the input voltage must be compensated for by means of a control process in the DC-to-DC converter. A control process which compensates for variations in the output voltage of a DC-to-DC converter generally has a finite delay. Therefore, interference in the input voltage is also compensated for by means of the control process only with a delay.

One idea of the present invention is therefore to take this knowledge into account and to provide a control process for a DC-to-DC converter which enables an output voltage which is as constant as possible in the case of an input voltage with interference. For this purpose, provision is made for variations, in particular interference, in the input voltage to be estimated in advance and to then concomitantly include this estimated value for the input voltage with interference in a control process for the DC-to-DC converter. In this case, periodic interference, for example ripple or the like, can be estimated very well, in particular. Consequently, a controlled variable which can compensate for the interference in the input voltage can be determined for such interference on the basis of an estimated value for the input voltage. Since these estimated values for the input voltage with interference can be calculated in advance or in real time, a suitable estimated value for the input voltage for controlling the DC-to-DC converter can be provided at any time. This makes it possible to generate a controlled variable which can compensate for the interference in the input voltage present on the input side of the DC-to-DC converter with a very high degree of probability. This makes it possible to keep the output voltage of the DC-to-DC converter at least approximately constant.

According to one embodiment, the computing device of the control apparatus is designed to calculate the estimated value for the input voltage on the basis of a polynomial. In particular, the computing device can calculate the estimated value for the input voltage on the basis of a polynomial with a predetermined degree. In each term of the polynomial, a value of the input voltage or a value of a temporally delayed input voltage can be multiplied by a previously determined factor. The calculation of voltage values on the basis of polynomials can be carried out in a very simple manner. This makes it possible to determine the estimated values for the input voltage using simple and therefore cost-effective hardware. In addition, the coefficients for such a polynomial for calculating the estimated values for the input voltage can be determined very easily.

According to one embodiment, the computing device is designed to set the predetermined degree of the polynomial for calculating the estimated value for the input voltage on the basis of an electrical load of the DC-to-DC converter. In particular, the degree of the polynomial can be set, for example, on the basis of an output electrical power of the DC-to-DC converter, an electrical current at the input or output of the DC-to-DC converter, an electrical voltage at the input or output of the DC-to-DC converter or a voltage measurement or a temperature measurement in the DC-to-DC converter. This makes it possible to determine estimated values for the input voltage in an efficient and, at the same time, precise manner. For example, the degree of the polynomial for calculating the estimated value for the input voltage can be varied between 1 and 4. The dependence between the electrical load of the DC-to-DC converter and the degree of the polynomial to be set can be set, for example, on the basis of previously determined specifications between the degree and the electrical load.

According to one embodiment, the computing device is designed to adapt the polynomial for calculating the estimated value for the input voltage on the basis of an output voltage of the DC-to-DC converter. In particular, the coefficients of the polynomial for calculating the estimated value for the input voltage can be determined on the basis of measured values of the output voltage or a profile of the output voltage. Any desired conventional or novel methods for determining the coefficients can be used for this purpose, in particular.

According to one embodiment, the estimated value for the input voltage comprises an AC voltage offset. In particular, the estimated value for the input voltage may comprise, for example, an input voltage having so-called ripple or the like. Such interference, for example ripple, occurs very frequently in voltage supplies for electrical drive systems having a power converter, for example. In particular, periodic signals, such as an AC voltage offset or the like, can be estimated very well in advance. It is therefore possible to compensate very well for interference in the input voltage of a DC-to-DC converter for such applications.

According to one embodiment, the computing device is designed to limit an amplitude of the AC voltage offset to a predetermined value. This makes it possible to stabilize the control process for the DC-to-DC converter. For example, the amplitude for an AC voltage offset in the input voltage can be limited to a value of 30 V, 20 V, 15 V, 10 V or 5 V.

According to one embodiment, the computing device is designed to limit the frequency of the AC voltage offset for the estimated value of the input voltage to a predetermined frequency. Interfering components at higher frequencies can generally be compensated for very well by means of alternative measures, for example a frequency filter, a filter capacitor or the like. However, if higher-frequency interference occurs, interfering components in the input voltage at a frequency below a predefined limit value, for example 10 kHz, can also still be estimated and compensated for.

According to one embodiment, the controlled variable which is determined by the control device comprises a duty cycle, a phase angle or a further parameter for controlling switching elements in the DC-to-DC converter. In the case of a DC-to-DC converter which operates on the basis of pulse width modulation, in particular, the required duty cycle can be set by determining the controlled variable in the control device.

The above configurations and developments can be combined with one another as desired, if useful. Further configurations, developments and implementations of the invention also comprise not explicitly mentioned combinations of features of the invention which are described above or below with respect to the exemplary embodiments. In particular, a person skilled in the art will also add individual aspects as improvements or additions to the fundamental basic forms of the present invention.

BRIEF DESCRIPTION OF THE DRAWINGS

The present invention is explained in more detail below on the basis of the exemplary embodiments indicated in the schematic figures of the drawings, in which.

DETAILS DESCRIPTION

Figure 1:
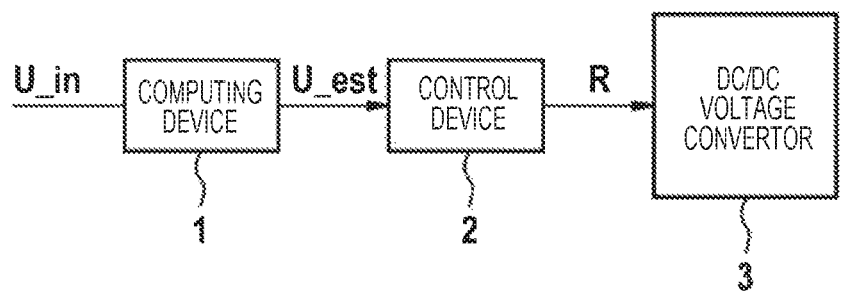
FIG. 1: shows a schematic illustration of a DC-to-DC converter having a control apparatus according to one embodiment.

FIG. 1 shows a schematic illustration of a DC-to-DC converter for converting an input voltage into an output voltage. The DC-to-DC converter comprises a DC voltage converter 3, on the input side of which the input voltage is provided. The DC-to-DC converter 3 then converts the input voltage into an output voltage on the basis of a controlled variable R. In this case, the controlled variable R can be determined by means of a control device 2 using different parameters. In particular, the control device 2 can determine the controlled variable R for the DC voltage converter 3 on the basis of a predefined desired output voltage U_des. The control device can also take into account a (theoretical) input voltage of the DC-to-DC converter for the purpose of determining the controlled variable. Further parameters, for example a load of the DC-to-DC converter on the output side, an output power or a current at the output of the DC-to-DC converter, may likewise be taken into account. If appropriate, it is also possible to determine the controlled variable R by combining a plurality of individually determined partial controlled variables. For example, a first controlled variable can be calculated using the desired output voltage U_des and the (theoretical) input voltage U_in. A further controlled variable can also be calculated by means of a separate device using the instantaneous output voltage and possibly further parameters. In this case, the individual controlled variables can be combined, for example added, in order to arrive at an overall controlled variable R for controlling the DC voltage converter 3.

If the input voltage U_in of the DC-to-DC converter varies, this variation will generally initially also affect the output voltage output by the DC-to-DC converter. The variation in the output voltage can then be captured, if appropriate, and the controlled variable R for controlling the DC voltage converter 3 can then be accordingly adapted. In this case, however, the controlled variable R can be corrected only when a deviation of the output voltage from a predefined desired value has been previously determined. Therefore, in a conventional DC-to-DC converter, variations in the input voltage U_in will generally also become noticeable, at least briefly, at the output of the DC-to-DC converter. In the case of higher input voltages in particular, the input voltage generally cannot be directly captured or can be captured only with a large amount of effort for safety reasons. Therefore, no direct information relating to the input voltage U_in is therefore available in numerous applications.

If the input voltage U_in is affected by interference, this interference will therefore also become noticeable in the output voltage of the voltage converter. However, a temporal profile of an input voltage affected by interference can be at least approximately estimated in numerous applications. In particular, if the input voltage is affected by periodic interference, this periodic interference can be determined. The controlled variable R can then be accordingly adapted on the basis of this determined interference in the input voltage.

If the input voltage of the DC-to-DC converter is, for example, a voltage from a high-voltage network of an electric or hybrid vehicle, this input voltage may be affected by so-called ripple on account of an electrical power converter in the drive system of the vehicle. In this case, the frequency or the frequency components of the ripple depend(s), inter alia, on the respective clock frequency of the power converter in the drive system of the electric or hybrid vehicle. Voltage fluctuations having an amplitude of up to 30 V or more can generally occur in this case.

In order to compensate for interference or voltage fluctuations in the input voltage, the computing device 1 of the DC-to-DC converter may calculate an estimated value for the input voltage of the DC-to-DC converter. This estimated value for the input voltage can be determined, for example, on the basis of previously detected voltage fluctuations in the output voltage of the DC-to-DC converter. In particular, if a periodic fluctuation has been detected in the output voltage of the voltage converter, this may be an indication of periodic interference in the input voltage of the DC-to-DC converter. Accordingly, the further profile of the input voltage may be estimated on the basis of previously determined fluctuations in the output voltage of the DC-to-DC converter.

The computing device 1 may add or subtract a calculated correction value, for example, to or from a value for the input voltage U_in made available to the computing device 1. This correction value can be determined, in particular, on the basis of previously determined fluctuations in the output voltage of the DC-to-DC converter.

In particular, an estimate for a correction value of the input voltage of the DC-to-DC converter can be calculated on the basis of a polynomial. A Lagrange expansion, for example, can be used, in particular, for the polynomial for this purpose, which provides the basis for calculating the estimated values for the input voltage. The determination of the coefficients for a Lagrange polynomial is generally known and is therefore not explained in any more detail below. In addition, any desired other methods for estimating the input voltage of the DC-to-DC converter are also fundamentally possible.

If the estimated value for the input voltage is intended to be calculated on the basis of a polynomial, a maximum degree for this polynomial can already be stipulated in advance for this purpose. In particular, Lagrange expansions with a polynomial up to the fourth degree are suitable, for example. In addition, however, polynomials with a higher degree may also possibly be used. In particular, it is also possible to dynamically adapt the degree of the polynomial for determining the estimated value for the input voltage.

For example, it is possible to adapt the degree of the polynomial for estimating the input voltage U_in on the basis of a load of the DC-to-DC converter. The load of the DC-to-DC converter can be determined, for example, on the basis of an output electrical power, an electrical current and/or an electrical voltage in the DC-to-DC converter. In particular, it is possible to reduce the degree of the polynomial for determining the estimated value U_est of the input voltage with an increasing load of the DC-to-DC converter. A fourth-degree polynomial can be used to calculate the estimated value U_est, for example in the case of low electrical load of the DC-to-DC converter. With increasing load, this degree of the polynomial can be reduced, and the degree of the polynomial may possibly also be only one when a predefined power is reached. The relationship between the electrical load of the DC-to-DC converter and the respectively used degree of the polynomial for calculating the estimated value U_est of the input voltage can possibly be stipulated in advance and stored in the computing device 1. If the degree of the polynomial is intended to be reduced, the coefficients of the higher degrees can be set to zero, for example, for this purpose.

The coefficients for the polynomial for estimating the input voltage can be determined, for example, when initializing or starting the DC-to-DC converter. For example, the output voltage of the DC-to-DC converter can be analyzed after the DC-to-DC converter has been started and variations in the output voltage can be identified in this case. The coefficients of a polynomial for estimating the input voltage can be calculated on the basis of these variations in the output voltage. An estimated value U_est for the input voltage can then be calculated and the controlled variable R for controlling the DC voltage converter 3 can be accordingly adapted on the basis of this estimated value U_est for the input voltage. If it is then determined that the output voltage of the DC-to-DC converter remains at least approximately constant, that is to say the absolute value of the deviation of the output voltage remains below a predefined threshold value, the determined coefficients for the polynomial for estimating the input voltage can then be kept constant.

If appropriate, the coefficients for estimating the input voltage can be regularly recalculated for predefined events. For example, the computing device 1 can be respectively reset after a predetermined period. For this purpose, all coefficients of the polynomial are initially set to zero, for example. The output voltage of the DC-to-DC converter is then evaluated. Suitable coefficients for estimating the input voltage can then be determined again on the basis of the variations in the output voltage of DC-to-DC converter after a reset.

Furthermore, it is also possible to respectively determine or adapt the coefficients for estimating the input voltage again when the output voltage of the DC-to-DC converter deviates from a desired value of the output voltage by more than a predefined limit value. Further criteria and events which trigger a recalculation or a correction of the coefficients for estimating the input voltage are also likewise possible.

Figure 2:
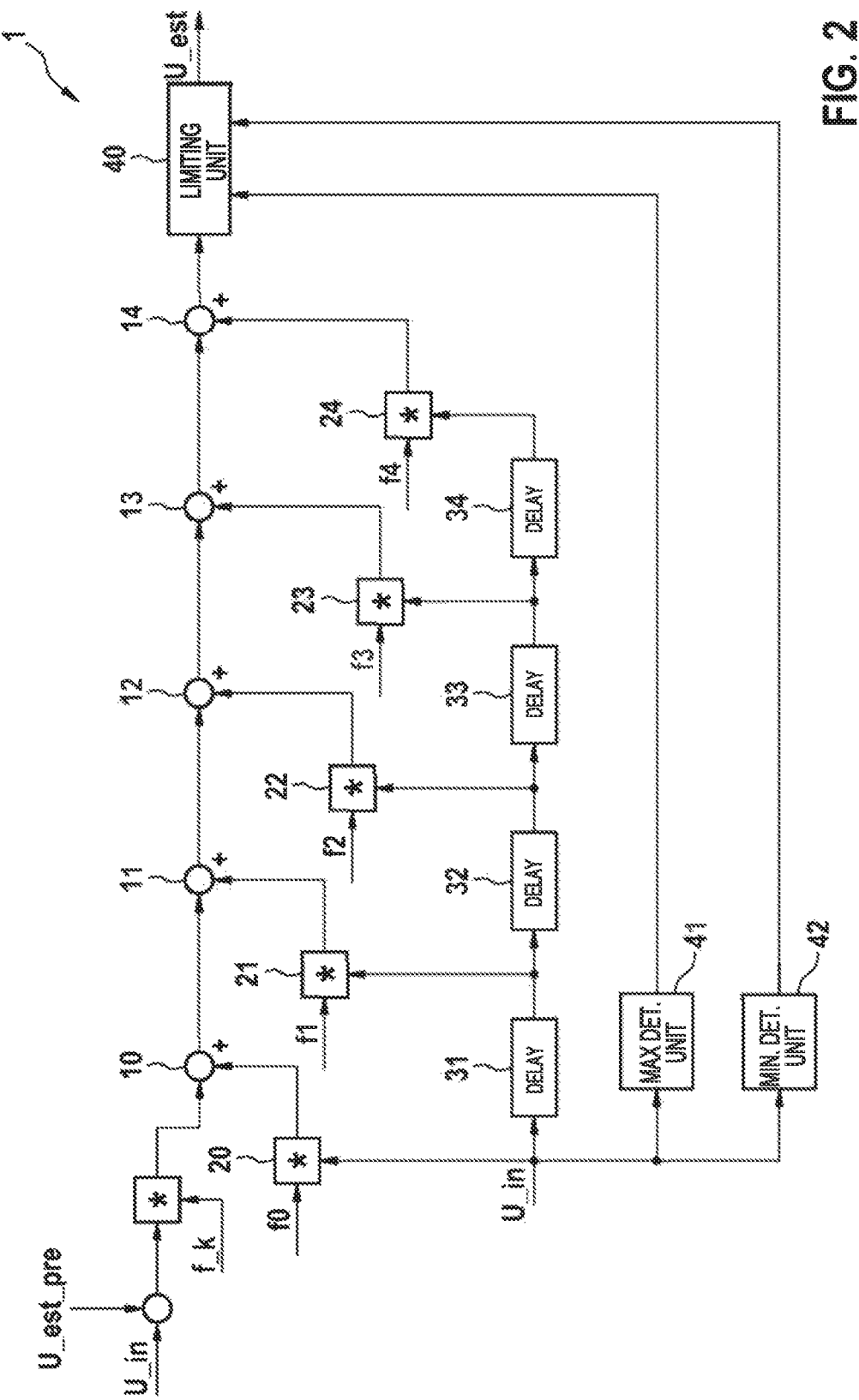
FIG. 2: shows a schematic illustration of the calculation of an estimated value for the input voltage in a computing device, on which one embodiment is based.

FIG. 2 shows a schematic illustration of an estimation of the input voltage in a computing device 1 according to one embodiment. The correction factors f0 to f4 are first of all determined and provided for a polynomial expansion, for example a fourth-degree Lagrange polynomial. If a polynomial with a degree of less than four is intended to be used to estimate the input voltage, the corresponding coefficients can be set to zero, for example. The value of the input voltage U_in is provided on the input side and is gradually delayed by the delay elements 31 to 34. The value of the input voltage U_in or the delayed values of the input voltage U_in is/are multiplied by the coefficients f0 to f4 in the multiplication elements 20 to 24 and the respective products are then added, together with a preliminary correction value, in the summation elements 10 to 14. In this case, the preliminary correction value results from the difference between the predefined input voltage U_in and the previous estimated value U_est_pre for the input voltage. If appropriate, this difference can be multiplied by a further factor f_k.

In addition, it is also possible to determine a maximum value for the input voltage to be estimated, possibly in a maximum determination unit 41. In a similar manner, a minimum value for the input voltage to be estimated can be determined in the unit 42. In this case, the estimated value of the input voltage can be limited to these maximum or minimum values in a limiting unit 40. As an output, the computing unit 1 then provides an estimated value U_est for the input voltage of the DC-to-DC converter. This estimated value U_est can then be used in the control device 2 to calculate the controlled variable R of the DC voltage converter 3.

Figure 3:
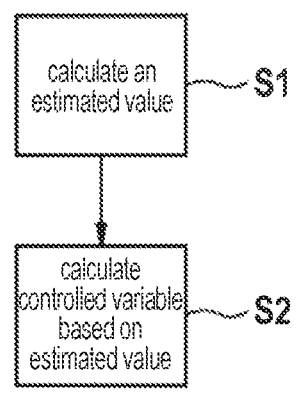
FIG. 3: shows a schematic illustration of a flowchart, on which a method for controlling a DC-to-DC converter according to one embodiment is based.

FIG. 3 shows a schematic illustration of a flowchart, on which a method for controlling a DC-to-DC converter according to one embodiment is based. In step S1, an estimated value U_est for an input voltage of the DC-to-DC converter is first of all calculated. In step S2, a controlled variable R for the DC-to-DC converter can be calculated on the basis of this calculated estimated value for the input voltage. The DC-to-DC converter can then be controlled on the basis of this controlled variable R.

In summary, the present invention relates to a control process for a DC-to-DC converter. Variations in the voltage on the input side of the DC-to-DC converter are compensated for by calculating an estimated value for the variations and determining a controlled variable for the DC-to-DC converter on the basis of the estimated values of the input voltage. The estimated values for the input voltage can be determined, for example, on the basis of a polynomial, for example by means of a Lagrange expansion.

The invention claimed is:

1. A method for controlling a DC-to-DC converter, having the steps of:
    calculating, via a computer, an estimated value for an input voltage of the DC-to-DC converter based on a polynomial of a predetermined degree and a previously estimated value for the input voltage including an AC voltage offset characterizing an interference component of the input voltage from a high-voltage network of an electric vehicle;
    setting the predetermined degree of the polynomial on the basis of an electrical load of the DC-to-DC converter; and
    controlling an output voltage of the DC-to-DC converter on the basis of the calculated estimated value for the input voltage
    wherein the predetermined degree of the polynomial is varied based on an electrical load of the DC-to-DC converter.

2. The method of claim 1, wherein the polynomial for calculating the estimated value for the input voltage is based on an output voltage of the DC-to-DC converter.

3. The method of claim 1, wherein a coefficient of the polynomial is determined based on a measured value of the output voltage of the DC-to-DC convertor or a profile of the output voltage.

4. The method of claim 1, wherein the AC voltage offset is determined based on a previously detected voltage fluctuation in the output voltage.

5. The method of claim 1, wherein the computer is configured to limit an amplitude of the AC voltage offset to a predetermined value.

6. The method of claim 1, wherein an amplitude of the AC voltage offset is greater than or equal to approximately 30 volts.

* * * * *